(12) United States Patent
Liu et al.

(10) Patent No.: US 11,412,506 B2
(45) Date of Patent: Aug. 9, 2022

(54) METHOD AND DEVICE USED IN NODE FOR WIRELESS COMMUNICATION

(71) Applicants: Zheng Liu, Shanghai (CN); Xiaobo Zhang, Shanghai (CN); Lin Yang, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 7 days.

(21) Appl. No.: 17/168,152

(22) Filed: Feb. 4, 2021

(65) Prior Publication Data

US 2021/0160840 A1 May 27, 2021

Related U.S. Application Data

(63) Continuation of application No. PCT/CN2019/104045, filed on Sep. 2, 2019.

(30) Foreign Application Priority Data

Sep. 13, 2018 (CN) .......................... 201811067344.9

(51) Int. Cl.
*H04W 72/04* (2009.01)
*H04L 27/26* (2006.01)
*H04W 4/40* (2018.01)

(52) U.S. Cl.
CPC ....... *H04W 72/044* (2013.01); *H04L 27/2605* (2013.01); *H04W 4/40* (2018.02)

(58) Field of Classification Search
CPC .... H04W 72/044; H04W 4/40; H04L 27/2605
See application file for complete search history.

(56) References Cited

U.S. PATENT DOCUMENTS 10,624,036 B2 * 4/2020 Zhang ................. H04W 52/146
11,201,656 B2 * 12/2021 Zhang ................... H04W 24/08
(Continued)

FOREIGN PATENT DOCUMENTS

| CN | 103902385 A | 7/2014 |
| CN | 106961742 A | 7/2017 |

(Continued)

OTHER PUBLICATIONS

CN201811067344.9 Notification to Grant Patent Right for Invention dated Nov. 5, 2020.
(Continued)

*Primary Examiner* — Rasheed Gidado

(57) ABSTRACT

The disclosure provides a method and a device used in node for wireless communication. The communication node first transmits first information, and then transmits a first radio signal; the first radio signal occupies a first time interval in time domain; the first information is used for indicating a target time length, the target time length is one candidate time length in a target candidate time length set; the first time interval belongs to a first time window, time domain resources in the first time window other than the first time interval are reserved as a gap by a transmitter of the first radio signal, and the target time length is equal to a difference value between the time length of the first time window and the time length of the first time interval. The disclosure improves resource utilization.

20 Claims, 12 Drawing Sheets

(56) References Cited

U.S. PATENT DOCUMENTS

| | | | |
|---|---|---|---|
| 11,223,456 B2 * | 1/2022 | Manolakos | H04W 8/22 |
| 2014/0075446 A1 | 3/2014 | Wang et al. | |
| 2015/0078318 A1 | 3/2015 | Dinan | |
| 2017/0048035 A1 | 2/2017 | Verbin et al. | |
| 2017/0048041 A1 | 2/2017 | Yi et al. | |
| 2020/0008025 A1 * | 1/2020 | Lee | H04W 28/02 |

FOREIGN PATENT DOCUMENTS

| | | |
|---|---|---|
| CN | 107439023 A | 12/2017 |
| CN | 107769903 A | 3/2018 |
| CN | 108024363 A | 5/2018 |
| CN | 108401286 A | 8/2018 |
| EP | 3364703 A1 | 8/2018 |

OTHER PUBLICATIONS

CN201811067344.9 1st Office Action dated Aug. 5, 2020.
CN201811067344.9 First Search Report dated Jul. 30, 2020.
ISR received in application No. PCT/CN2019/104045 dated Nov. 1, 2019.
Nokia et al."UE capability on Need for Gap in SA"R2-1812915,Aug. 24, 2018.
Zte "3GPP TSG-RAN WG4 Meeting RAN4#84 R4-1708195"Aug. 25, 2017.
Samsung «Report of Email Discussion[NR-AH1801#08]NR]Measurement gap coordination assistanceinfo» 3GPP TSG-RAN WG2 Meeting#101 R2-1803042 Mar. 2, 2018.

* cited by examiner

| SCS=60kHz, FR1 | | | |
|---|---|---|---|
| CP type | Position in subframe | CP length (microsecond) | Target candidate time length set |
| Normal CP | $l=7$ or $l=28$ | 1.69 | {1112Ts, 564Ts} |
| | $l \neq 7$ and $l \neq 28$ | 1.17 | {1096Ts, 548Ts} |
| Extended CP | $l=0,1,2,...,55$ | 4.17 | {1280Ts, 640Ts} |

FIG. 7

| Frequency domain position | First threshold | Second threshold |
|---|---|---|
| FR1 | 1096Ts | 548Ts |
| FR2 | 548Ts | 256Ts |

FIG. 8

| Subcarrier spacing | First time length (that is, summation of second time length and CP length) | Second time length | CP length | Target candidate time length set (FR1) | Target candidate time length set (FR2) |
|---|---|---|---|---|---|
| 15kHz | $2192T_s$ | $2048T_s$ | $144T_s$ | $\{1024T_s (K1=0,K2=1/2), 512T_s (K1=0, K2=1/4)\}$ | NA |
| 30kHz | $1096T_s$ | $1024T_s$ | $72T_s$ | $\{1096T_s (K1=1,K2=2), 512T_s (K1=0,K2=1/2)\}$ | NA |
| 60kHz | $548T_s$ | $512T_s$ | $36T_s$ | $\{1096T_s (K1=2,K2=0), 548T_s (K1=1,K2=0)\}$ | $\{548T_s (K1=1,K2=0), 256T_s (K1=0,K2=1/2)\}$ |
| 120kHz | $274T_s$ | $256T_s$ | $18T_s$ | NA | $\{548T_s (K1=2,K2=0), 274T_s (K1=1,K2=0)\}$ |

FIG. 9

| Subcarrier spacing | Maximum sampling interval length |
|---|---|
| 15kHz | $8000T_s$ |
| 30kHz | $4000T_s$ |
| 60kHz | $2000T_s$ |
| 120kHz | $1000T_s$ |

FIG. 10

METHOD AND DEVICE USED IN NODE FOR WIRELESS COMMUNICATION

CROSS REFERENCE TO RELATED APPLICATIONS

This application is a continuation of International Application No. PCT/CN2019/104045, filed Sep. 2, 2019, claims the priority benefit of Chinese Patent Application No. 201811067344.9, filed on Sep. 13, 2018, the full disclosure of which is incorporated herein by reference.

BACKGROUND

Technical Field

The disclosure relates to transmission methods and devices in wireless communication systems, and in particular to a method and device with multiple numerologies in wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or 5G). The Work Item (W1) of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. The Study Item (SI) of technical research of NR V2X was approved at the 3GPP RAN #80 session.

SUMMARY

Compared with existing LTE systems, 5G NR has a significant feature that it is capable of supporting a more flexible numerology, including Subcarrier Spacing (SCS) and Cyclic Prefix (CP) length, and supporting a more flexible frame structure, including mini-slot, sub-slot and slot aggregation. This kind of flexible numerology and flexible frame structure can better meet a variety of new service requirements, particularly the very diverse service requirements of vertical industries. In V2X systems, due to a timing inconsistency of transmission in sidelink and time restrictions of switching between transmitting (Tx) and receiving (Rx), a gap is reserved to avoid collision or to transmit Tx/Rx switching before transmission is started or after transmission is ended; since the time length of the gap generally is only related to a Tx-Rx/Rx-Tx switching time of equipment and a transmission distance, a header overhead occupied by the gap occupies different proportions when different numerologies are employed.

In view of the problems of gap configuration in the condition that multiple numerologies are supported in NR V2X, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred. In particular, the solution provided in the disclosure can be applied to both NR V2X communications and communications between a base station and a UE.

The disclosure provides a method in a first communication node for wireless communication, wherein the method includes:

transmitting first information, the first information being used for indicating a target time length, the target time length being one candidate time length in a target candidate time length set, the target candidate time length set including a positive integer number, greater than 1, of candidate time lengths, and the first information being transmitted through an air interface; and transmitting a first radio signal, the first radio signal occupying a first time interval in time domain.

Herein, the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, the process of determining the target candidate time length set based on a subcarrier spacing of a subcarrier occupied by the first radio signal can guarantee that the time length of a gap will not impact the usage of the multicarrier symbol including the gap when different subcarrier spacings are employed, thereby improving the utilization of resources and reducing the impacts of the gap.

In one embodiment, the first information can support a configurable time length of a gap, thereby reducing the header overhead of the gap in the condition of different coverages and further improving the utilization of resources.

According to one aspect of the disclosure, the above method is characterized in that: for a given subcarrier spacing of a subcarrier occupied by the first radio signal and a given position of frequency domain resources occupied by the first radio signal in frequency domain, a length of a cyclic prefix in one multicarrier symbol occupied by the first radio signal in time domain is also used for determining the target candidate time length set.

According to one aspect of the disclosure, the above method is characterized in that: the position of frequency domain resources occupied by the first radio signal in frequency domain is used for determining at least one of a first threshold or a second threshold, the first threshold is equal to a maximum candidate time length in the target candidate time length set, and the second threshold is equal to a minimum candidate time length in the target candidate time length set.

According to one aspect of the disclosure, the above method is characterized in that: a duration in time domain of one multicarrier symbol among the multicarrier symbols occupied by the first radio signal is equal to a first time length; a data time length in one multicarrier symbol among the multicarrier symbols occupied by the first radio signal is equal to a second time length; any one candidate time length in the target candidate time length set is equal to a summation of K1 time(s) of the first time length plus K2 time(s) of the second time length, K1 is a non-negative integer, and K2 is equal to a difference between 1 and a non-negative integral power of ½; and a subcarrier spacing of a subcarrier occupied by the first radio signal is used for determining the first time length and the second time length.

According to one aspect of the disclosure, the above method is characterized in that: each candidate time length in the target candidate time length set is equal to a positive integral multiple of a maximum sampling interval length, and a subcarrier spacing of a subcarrier occupied by the first radio signal is used for determining the maximum sampling interval length.

In one embodiment, through making each candidate time length in the target candidate time length set be equal to a positive integral multiple of the maximum sampling interval length, a flexible selection of sampling rate is ensured in implementation and the complexity of processing is reduced.

According to one aspect of the disclosure, the above method further includes:

transmitting second information.

Herein, the second information is used for indicating at least one of a subcarrier spacing of a subcarrier occupied by the first radio signal or the first time window, and the second information is transmitted through the air interface.

The disclosure provides a method in a second communication node for wireless communication, wherein the method includes:

receiving first information, the first information being used for indicating a target time length, the target time length being one candidate time length in a target candidate time length set, the target candidate time length set including a positive integer number, greater than 1, of candidate time lengths, and the first information being transmitted through an air interface; and receiving a first radio signal, the first radio signal occupying a first time interval in time domain.

Herein, the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

According to one aspect of the disclosure, the above method is characterized in that: for a given subcarrier spacing of a subcarrier occupied by the first radio signal and a given position of frequency domain resources occupied by the first radio signal in frequency domain, a length of a cyclic prefix in one multicarrier symbol occupied by the first radio signal in time domain is also used for determining the target candidate time length set.

According to one aspect of the disclosure, the above method is characterized in that: the position of frequency domain resources occupied by the first radio signal in frequency domain is used for determining at least one of a first threshold or a second threshold, the first threshold is equal to a maximum candidate time length in the target candidate time length set, and the second threshold is equal to a minimum candidate time length in the target candidate time length set.

According to one aspect of the disclosure, the above method is characterized in that: a duration in time domain of one multicarrier symbol among the multicarrier symbols occupied by the first radio signal is equal to a first time length; the product of a difference between (1 and the K1th power of 2) times a data time length in one multicarrier symbol among the multicarrier symbols occupied by the first radio signal is equal to a second time length; K1 is an integer less than 1; any one candidate time length in the target candidate time length set is equal to a summation of the second time length plus K2 time(s) of the first time length, and K2 is a non-negative integer; and a subcarrier spacing of a subcarrier occupied by the first radio signal is used for determining the first time length and the second time length.

According to one aspect of the disclosure, the above method is characterized in that: each candidate time length in the target candidate time length set is equal to a positive integral multiple of a maximum sampling interval length, and a subcarrier spacing of a subcarrier occupied by the first radio signal is used for determining the maximum sampling interval length.

According to one aspect of the disclosure, the above method further includes:

receiving second information.

Herein, the second information is used for indicating at least one of a subcarrier spacing of a subcarrier occupied by the first radio signal or the first time window, and the second information is transmitted through the air interface.

The disclosure provides a first communication node for wireless communication, wherein the first communication node includes:

a first transmitter, to transmit first information, the first information being used for indicating a target time length, the target time length being one candidate time length in a target candidate time length set, the target candidate time length set including a positive integer number, greater than 1, of candidate time lengths, and the first information being transmitted through an air interface; and a second transmitter, to transmit a first radio signal, the first radio signal occupying a first time interval in time domain.

Herein, the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

The disclosure provides a second communication node for wireless communication, wherein the second communication node includes:

a first receiver, to receive first information, the first information being used for indicating a target time length, the target time length being one candidate time length in a target candidate time length set, the target candidate time length set including a positive integer number, greater than 1, of candidate time lengths, and the first information being transmitted through an air interface; and a second receiver, to receive a first radio signal, the first radio signal occupying a first time interval in time domain.

Herein, the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, compared with the methods in existing LTE V2X systems, the disclosure has the following advantages.

When a gap occupies partial time domain resources in one multicarrier symbol, in order to make full use of the remaining resources in the multicarrier symbol (for example, employing a method of IFDMA or block repetition), the length of the remaining data resource should best meet a specific condition. The length of a cyclic prefix should remain constant as far as possible in order to keep the capability of suppressing Inter Symbol Interference (ISI) and Inter Carrier Interference (ICI). When a transmission of multiple numerologies is supported, since the duration of one multicarrier symbol changes with the numerology, even though the absolute requirement for gap length remains the same (for example, same Tx/Rx switching time and coverage), in order to meet the above requirements (the specific length conditions of the remaining data resources and the requirements of keeping CP length constant), it is also needed to perform a minor adjustment on a candidate configurable gap length based on numerology. The method in the disclosure provides a solution to fulfill the minor adjustment of gap based on numerology, so that time domain resources in the multicarrier symbol other than the gap can be effectively used, thereby improving the utilization of resources.

The minimum sampling rate required during baseband processing is related to a subcarrier spacing of a subcarrier. When the minimum sampling rate is employed to perform sampling (the sampling rate is selected autonomously when not less than the minimum sampling rate), the minimum time unit that can be processed in time domain is a sampling interval (maximum sampling interval) corresponding to the minimum sampling rate, thus the time length of the gap needs to be set meeting a positive integral multiple of the maximum sampling interval. The method in the disclosure provides a flexibility of implementation and reduces the complexity of processing.

The method in the disclosure can support a configurable time length of a gap, thereby reducing the header overhead of the gap in the condition of different coverages and further improving the utilization of resources.

BRIEF DESCRIPTION OF THE DRAWINGS

Other features, purposes and advantages of the disclosure will become more apparent from the detailed description of non-restrictive embodiments taken in conjunction with the following drawings.

FIG. 7 is a diagram illustrating a relationship between a length of a cyclic prefix and a target candidate time length set according to one embodiment of the disclosure.

FIG. 8 is a diagram illustrating a first threshold and a second threshold according to one embodiment of the disclosure.

FIG. 9 is a diagram illustrating a relationship between a first time length, a second time length and a target candidate time length set according to one embodiment of the disclosure.

FIG. 10 is a diagram illustrating a maximum sampling interval length according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
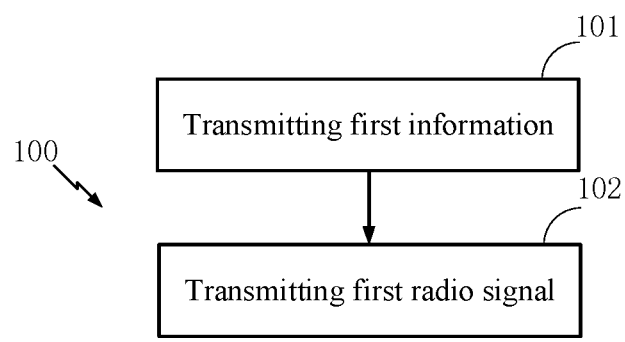
FIG. 1 is a flowchart of first information and a first radio signal according to one embodiment of the disclosure.

Embodiment 1 illustrates a flowchart of first information and a first radio signal according to one embodiment of the disclosure, as shown in FIG. 1. In FIG. 1, each step represents one step.

In Embodiment 1, the first communication node in the disclosure first transmits first information and then transmits a first radio signal; wherein the first information is used for indicating a target time length, the target time length is one candidate time length in a target candidate time length set, the target candidate time length set includes a positive integer number, greater than 1, of candidate time lengths, and the first information is transmitted through an air interface; the first radio signal occupies a first time interval in time domain; the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, the first information is one piece of physical layer information.

In one embodiment, the first information is one piece of higher layer information.

In one embodiment, the first information is transmitted through one physical layer signaling.

In one embodiment, the first information is transmitted through a Physical Sidelink Control Channel (PSCCH).

In one embodiment, the first information is transmitted through a Physical Downlink Control Channel (PDCCH).

In one embodiment, the first information is transmitted through a Physical Sidelink Shared Channel (PSSCH).

In one embodiment, the first information includes partial or all of one piece of Sidelink Control Information (SCI).

In one embodiment, the first information includes partial fields or all fields in one SCI.

In one embodiment, the first information includes partial fields or all fields in one piece of Downlink Control Information (DCI).

In one embodiment, the first information includes partial or all of one higher layer signaling.

In one embodiment, the first information includes partial Information Elements (IEs) or all IEs in one higher layer signaling.

In one embodiment, the first information includes partial fields or all fields in one IE in one higher layer signaling.

In one embodiment, the phrase that the first information is used for indicating the target time length refers that: the first information is used for directly indicating the target time length.

In one embodiment, the phrase that the first information is used for indicating the target time length refers that: the first information is used for indirectly indicating the target time length.

In one embodiment, the phrase that the first information is used for indicating the target time length refers that: the first information is used for explicitly indicating the target time length.

In one embodiment, the phrase that the first information is used for indicating the target time length refers that: the first information is used for implicitly indicating the target time length.

In one embodiment, the phrase that the first information is used for indicating the target time length refers that: the first information is used for indicating the target time length from the target candidate time length set.

In one embodiment, the target time length is equal to a duration of X multicarrier symbol(s), and the phrase that the first information is used for indicating the target time length refers that: the first information is used for indicating the X, and the X is a positive integer.

In one embodiment, the target time length is equal to a duration of W1 time unit(s), each one of the W1 time unit(s) has a duration equal to $$\frac{1}{480 \times 10^3 \times 4096}$$

seconds, and the W1 is a positive integer; and the phrase that the first information is used for indicating the target time length refers that: the first information is used for indicating the W1.

In one embodiment, the target time length is equal to a duration of W2 time unit(s), each one of the W2 time unit(s) has a duration equal to $$\frac{1}{15 \times 10^3 \times 2048}$$

seconds, and the W2 is a positive integer; and the phrase that the first information is used for indicating the target time length refers that: the first information is used for indicating the W2.

In one embodiment, the target time length is equal to Y1 millisecond(s), and the Y1 is a positive rational number; and the phrase that the first information is used for indicating the target time length refers that: the first information is used for indicating the Y1.

In one embodiment, the target time length is equal to Y2 microsecond(s), and the Y2 is a positive rational number; and the phrase that the first information is used for indicating the target time length refers that: the first information is used for indicating the Y2.

In one embodiment, the target time length is related to a time needed by a transmitter of the first radio signal to perform Tx-Rx switching in a Frequency Range (FR) for frequency domain resources of the first radio signal.

In one embodiment, the target time length is related to a time needed by a transmitter of the first radio signal to perform Rx-Tx switching in a Frequency Range (FR) for frequency domain resources of the first radio signal.

In one embodiment, the target time length is related to a distance between a transmitter of the first radio signal and a receiver of the first radio signal.

In one embodiment, the air interface is wireless.

In one embodiment, the air interface includes a wireless channel.

In one embodiment, the air interface is an interface between the second communication node and the first communication node in the disclosure.

In one embodiment, the air interface is a Uu interface.

In one embodiment, the air interface is a Pc5 interface.

In one embodiment, the air interface is through a sidelink.

In one embodiment, any two candidate time lengths in the target candidate time length set are unequal.

In one embodiment, two candidate time lengths in the target candidate time length set are unequal.

In one embodiment, two candidate time lengths in the target candidate time length set are equal.

In one embodiment, any one candidate time length in the target candidate time length set is equal to a duration of X multicarrier symbol(s), and the X is a positive integer.

In one embodiment, any one candidate time length in the target candidate time length set is equal to a duration of W1 time unit(s), each one of the W1 time unit(s) has a duration equal to $$\frac{1}{480 \times 10^3 \times 4096}$$

seconds, and the W1 is a positive integer.

In one embodiment, any one candidate time length in the target candidate time length set is equal to a duration of W2 time unit(s), each one of the W2 time unit(s) has a duration equal to $$\frac{1}{15\times10^3\times2048}$$

seconds, and the W2 is a positive integer.

In one embodiment, any one candidate time length in the target candidate time length set is equal to Y1 millisecond(s), and the Y1 is a positive rational number.

In one embodiment, any one candidate time length in the target candidate time length set is equal to Y2 microsecond(s), and the Y2 is a positive rational number.

In one embodiment, one Transport Block (TB) is processed in sequence through CRC insertion, channel coding, rate matching, scrambling, modulation, layer mapping, precoding, mapping to resource element, OFDM baseband signal generation, and modulation and upconversion to obtain the first radio signal.

In one embodiment, one TB is processed in sequence through CRC insertion, channel coding, rate matching, scrambling, modulation, layer mapping, precoding, mapping to virtual resource blocks, mapping from virtual to physical resource blocks, OFDM baseband signal generation, and modulation and upconversion to obtain the first radio signal.

In one embodiment, one TB is processed in sequence through CRC insertion, segmentation, code block level CRC insertion, channel coding, rate matching, concatenation, scrambling, modulation, layer mapping, precoding, mapping to resource element, OFDM baseband signal generation, and modulation and upconversion to obtain the first radio signal.

In one embodiment, one TB is processed in sequence through CRC insertion, segmentation, code block level CRC insertion, channel coding, rate matching, concatenation, scrambling, modulation, layer mapping, precoding, mapping to virtual resource blocks, mapping from virtual to physical resource blocks, OFDM baseband signal generation, and modulation and upconversion to obtain the first radio signal.

In one embodiment, one TB is processed in sequence through CRC insertion, channel coding, rate matching, scrambling, modulation, layer mapping, transform precoding, precoding, mapping to resource element, OFDM baseband signal generation, and modulation and upconversion to obtain the first radio signal.

In one embodiment, one TB is processed in sequence through CRC insertion, channel coding, rate matching, scrambling, modulation, layer mapping, transform precoding, precoding, mapping to virtual resource blocks, mapping from virtual to physical resource blocks, OFDM baseband signal generation, and modulation and upconversion to obtain the first radio signal.

In one embodiment, one TB is processed in sequence through CRC insertion, segmentation, code block level CRC insertion, channel coding, rate matching, concatenation, scrambling, modulation, layer mapping, transform precoding, precoding, mapping to resource element, OFDM baseband signal generation, and modulation and upconversion to obtain the first radio signal.

In one embodiment, one TB is processed in sequence through CRC insertion, segmentation, code block level CRC insertion, channel coding, rate matching, concatenation, scrambling, modulation, layer mapping, transform precoding, precoding, mapping to virtual resource blocks, mapping from virtual to physical resource blocks, OFDM baseband signal generation, and modulation and upconversion to obtain the first radio signal.

In one embodiment, one SCI is processed in sequence through CRC insertion, channel coding, rate matching, scrambling, modulation, mapping to physical resources, OFDM baseband signal generation, and modulation and upconversion to obtain the first radio signal.

In one embodiment, one SCI is processed in sequence through CRC insertion, channel coding, rate matching, scrambling, modulation, transform precoding, mapping to physical resources, OFDM baseband signal generation, and modulation and upconversion to obtain the first radio signal.

In one embodiment, the first time interval includes a positive integer number of consecutive multicarrier symbols(s) in time domain.

In one embodiment, the first time interval includes consecutive time domain resources.

In one embodiment, the first time interval includes a positive integer number of consecutive multicarrier symbols(s) in time domain and partial of one multicarrier symbol.

In one embodiment, the first time interval includes a positive integer number of sampling interval(s).

In one embodiment, the first time interval includes a positive integer number of sampling interval(s) with a sampling frequency of $480\times10^3\times4096$ Hz.

In one embodiment, the first time interval includes a positive integer number of sampling interval(s) with a sampling frequency of $15\times10^3\times2048$ Hz Hz.

In one embodiment, the first time window is one sub-frame.

In one embodiment, the first time window is one radio frame.

In one embodiment, for a given subcarrier spacing of a subcarrier occupied by the first radio signal, the first time window is one slot.

In one embodiment, for a given subcarrier spacing of a subcarrier occupied by the first radio signal and a given CP length in a multicarrier symbol occupied by the first radio signal, the first time window is one mini-slot.

In one embodiment, for a given subcarrier spacing of a subcarrier occupied by the first radio signal and a given CP length in a multicarrier symbol occupied by the first radio signal, the first time window is one sub-slot.

In one embodiment, the time length of the first time window is fixed.

In one embodiment, for a given subcarrier spacing of a subcarrier occupied by the first radio signal, the time length of the first time window is fixed.

In one embodiment, for a given subcarrier spacing of a subcarrier occupied by the first radio signal and a given CP length in a multicarrier symbol occupied by the first radio signal, the time length of the first time window is fixed.

In one embodiment, the first time interval is a time interval available for transmission in the first time window.

In one embodiment, the phrase that one time domain resource is reserved as a gap by a transmitter of the first radio signal includes: the time domain resource can neither be used by the transmitter of the first radio signal to perform transmitting nor perform receiving.

In one embodiment, the phrase that one time domain resource is reserved as a gap by a transmitter of the first radio signal includes: the time domain resource cannot be used by the transmitter of the first radio signal to perform transmission.

In one embodiment, the phrase that one time domain resource is reserved as a gap by a transmitter of the first radio signal includes: the time domain resource is used by the transmitter of the first radio signal to perform Tx-Rx switching.

In one embodiment, the phrase that one time domain resource is reserved as a gap by a transmitter of the first radio signal includes: the time domain resource is used by the transmitter of the first radio signal to perform Rx-Tx switching.

In one embodiment, the phrase that one time domain resource is reserved as a gap by a transmitter of the first radio signal includes: the time domain resource is used by the transmitter of the first radio signal to avoid collision.

In one embodiment, the phrase that one time domain resource is reserved as a gap by a transmitter of the first radio signal includes: the time domain resource is used by the transmitter of the first radio signal to avoid interference.

In one embodiment, the phrase that onetime domain resource is reserved as a gap by a transmitter of the first radio signal includes: the time domain resource is used by the transmitter of the first radio signal to avoid interference and perform Tx-Rx or Rx-Tx switching.

In one embodiment, a Subcarrier Spacing (SCS) of a subcarrier occupied by the first radio signal is equal to one of 15 KHz, 30 KHz, 60 KHz, 120 KHz, 240 KHz or 480 KHz.

In one embodiment, an SCS of a subcarrier occupied by the first radio signal is related to a frequency range for a carrier to which frequency domain resources occupied by the first radio signal in frequency domain belong.

In one embodiment, if a carrier to which frequency domain resources occupied by the first radio signal in frequency domain belong is in a Frequency Range 1, (FR, that is, below 6 GHz), an SCS of a subcarrier occupied by the first radio signal is equal to one of 15 KHz, 30 KHz or 60 KHz; if a carrier to which frequency domain resources occupied by the first radio signal in frequency domain belong is in a Frequency Range 2, (FR2, that is, above 6 GHz), an SCS of a subcarrier occupied by the first radio signal is equal to one of 60 KHz, 120 KHz, 240 KHz or 480 KHz In one embodiment, a position of frequency domain resources occupied by the first radio signal in frequency domain refers to: a sequence number of a band to which the frequency domain resources occupied by the first radio signal belong.

In one embodiment, a position of frequency domain resources occupied by the first radio signal in frequency domain refers to: an index of a band to which the frequency domain resources occupied by the first radio signal belong.

In one embodiment, a position of frequency domain resources occupied by the first radio signal in frequency domain refers to: a frequency range for a carrier to which the frequency domain resources occupied by the first radio signal belong, the frequency range including a Frequency Range 1 (FR1) and a Frequency Range 2 (FR2).

In one embodiment, the phrase that at least a former one of a subcarrier spacing of a subcarrier occupied by the first radio signal or a position of frequency domain resources occupied by the first radio signal in frequency domain is used for determining the target candidate time length set refers that: at least a former one of a subcarrier spacing of a subcarrier occupied by the first radio signal or a position of frequency domain resources occupied by the first radio signal in frequency domain is used by the first communication node to determine the target candidate time length set.

In one embodiment, the phrase that at least a former one of a subcarrier spacing of a subcarrier occupied by the first radio signal or a position of frequency domain resources occupied by the first radio signal in frequency domain is used for determining the target candidate time length set refers that: at least a former one of a subcarrier spacing of a subcarrier occupied by the first radio signal or a position of frequency domain resources occupied by the first radio signal in frequency domain is used by the second communication node in the disclosure to determine the target candidate time length set.

In one embodiment, the phrase that at least a former one of a subcarrier spacing of a subcarrier occupied by the first radio signal or a position of frequency domain resources occupied by the first radio signal in frequency domain is used for determining the target candidate time length set includes that: a subcarrier spacing of a subcarrier occupied by the first radio signal is used for determining the target candidate time length set.

In one embodiment, the phrase that at least a former one of a subcarrier spacing of a subcarrier occupied by the first radio signal or a position of frequency domain resources occupied by the first radio signal in frequency domain is used for determining the target candidate time length set includes that: a subcarrier spacing of a subcarrier occupied by the first radio signal or a position of frequency domain resources occupied by the first radio signal in frequency domain are used for determining the target candidate time length set.

In one embodiment, the phrase that at least a former one of a subcarrier spacing of a subcarrier occupied by the first radio signal or a position of frequency domain resources occupied by the first radio signal in frequency domain is used for determining the target candidate time length set refers that: at least a former one of a subcarrier spacing of a subcarrier occupied by the first radio signal or a position of frequency domain resources occupied by the first radio signal in frequency domain is used for determining the target candidate time length set based on a mapping relationship.

In one embodiment, the phrase that at least a former one of a subcarrier spacing of a subcarrier occupied by the first radio signal or a position of frequency domain resources occupied by the first radio signal in frequency domain is used for determining the target candidate time length set refers that: at least a former one of a subcarrier spacing of a subcarrier occupied by the first radio signal or a position of frequency domain resources occupied by the first radio signal in frequency domain is used for determining the target candidate time length set based on a mapping function.

In one embodiment, the phrase that at least a former one of a subcarrier spacing of a subcarrier occupied by the first radio signal or a position of frequency domain resources occupied by the first radio signal in frequency domain is used for determining the target candidate time length set refers that: at least a former one of a subcarrier spacing of a subcarrier occupied by the first radio signal or a position of frequency domain resources occupied by the first radio signal in frequency domain is used for determining the target candidate time length set based on a table relationship.

In one embodiment, the phrase that at least a former one of a subcarrier spacing of a subcarrier occupied by the first radio signal or a position of frequency domain resources occupied by the first radio signal in frequency domain is used for determining the target candidate time length set refers that: a subcarrier spacing of a subcarrier occupied by the first radio signal and a position of frequency domain resources occupied by the first radio signal in frequency domain constitute a target combination of subcarrier spacing and frequency domain position, the target combination of subcarrier spacing and frequency domain position is one of Q combinations of subcarrier spacings and frequency domain positions, the Q combinations of subcarrier spacings and frequency domain positions are one-to-one corresponding to Q candidate time length sets, the target candidate time length set is a candidate time length set in the Q candidate time length sets corresponding to the target combination of subcarrier spacing and frequency domain position, and the Q is a positive integer greater than 1.

In one embodiment, each candidate time length in the target candidate time length set is equal to $a \cdot N_{OS}^{\mu} + d \cdot N_u^{\mu}$, where $N_{OS}^{\mu}$ represents a duration in time domain of one multicarrier symbol among the multicarrier symbols occupied by the first radio signal, $N_{OS}^{\mu} = N_u^{\mu} + N_{CP,1}^{\mu}$, $N_u^{\mu}$ represents a data time length in one multicarrier symbol among the multicarrier symbols occupied by the first radio signal, $N_{CP,1}^{\mu}$ represents a length of a cyclic prefix in one multicarrier symbol among the multicarrier symbols occupied by the first radio signal, a represents a non-negative positive integer, d is equal to 0 or d is equal to a negative integral power of 2.

Embodiment 2

Figure 2:
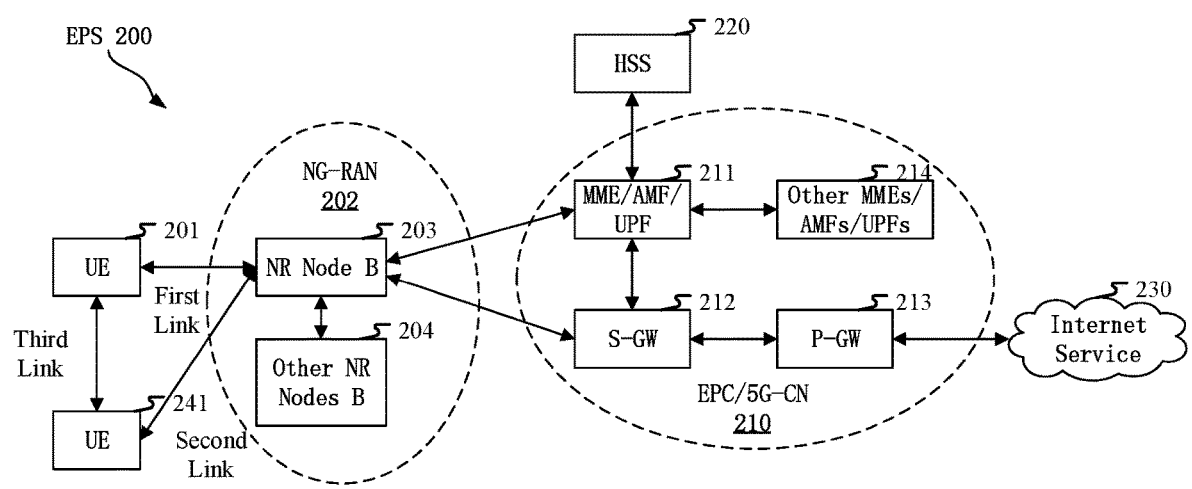
FIG. 2 is a diagram illustrating a network architecture according to one embodiment of the disclosure.

Embodiment 2 illustrates a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. In V2X networks, gNB 203 may be a base station, a terrestrial base station or a Road Side Unit (RSU) repeated by a satellite, etc. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, communication units in automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, an automobile terminal, a V2X equipment or some other appropriate terms. The gNB 203 is connected to the EPC/5G-CN 210 via an S1/NG interface.

The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first communication node in the disclosure.

In one embodiment, the UE 201 supports transmissions in sidelink.

In one embodiment, the UE 201 supports a PC5 interface.

In one embodiment, the UE 201 supports V2X networks.

In one embodiment, the UE 201 supports V2X services.

In one embodiment, the UE 241 corresponds to the second communication node in the disclosure.

In one embodiment, the UE 241 supports transmissions in sidelink.

In one embodiment, the UE 241 supports a PC5 interface.

In one embodiment, the UE 241 supports V2X networks.

In one embodiment, the UE 241 supports V2X services.

In one embodiment, the UE 201 and the UE 241 are under the coverage of one same base station.

In one embodiment, the UE 201 and the UE 241 are under the coverages of different base stations.

In one embodiment, the UE 201 and the UE 241 are not under the coverage of any base station.

In one embodiment, one of the UE 201 and the UE 241 is under the coverage of one base station, and the other one is not under the coverage of any base station.

Embodiment 3

Figure 3:
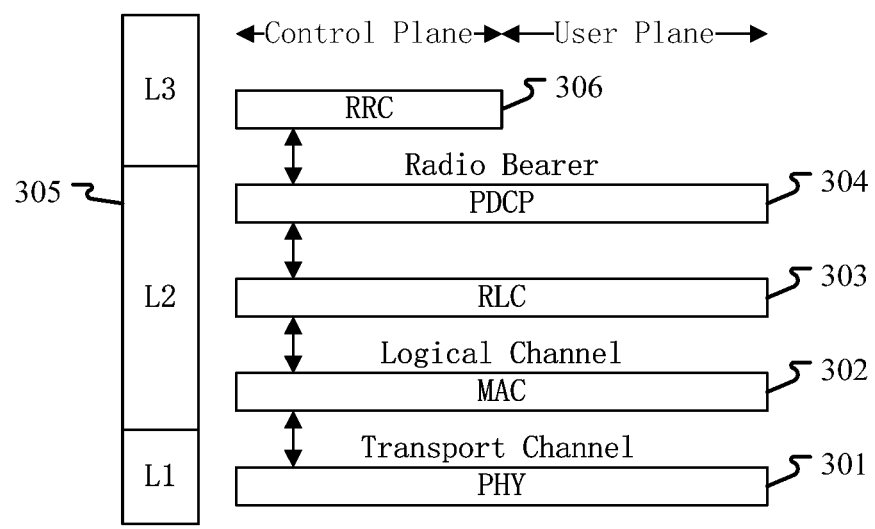
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane and a control plane (if supported). In FIG. 3, the radio protocol architecture of a first communication node (UE or RSU in V2X) and a second communication node (another UE or RSU in V2X) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the first communication node and the second communication node over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304. Although not shown, the first communication node and the second communication node may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks). The MAC sublayer 302, if supported, is also in charge of HARQ operations. In the control plane, the radio protocol architecture of the first communication node and the second communication node is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling.

In one embodiment, the radio protocol architecture shown in FIG. 3 is applicable to the first communication node in the disclosure.

In one embodiment, the radio protocol architecture shown in FIG. 3 is applicable to the second communication node in the disclosure.

In one embodiment, the first information in the disclosure is generated on the RRC 306.

In one embodiment, the first information in the disclosure is generated on the MAC 302.

In one embodiment, the first information in the disclosure is generated on the PHY 301.

In one embodiment, the first radio signal in the disclosure is generated on the RRC 306.

In one embodiment, the first radio signal in the disclosure is generated on the MAC 302.

In one embodiment, the first radio signal in the disclosure is generated on the PHY 301.

In one embodiment, the second information in the disclosure is generated on the RRC 306.

In one embodiment, the second information in the disclosure is generated on the MAC 302.

In one embodiment, the second information in the disclosure is generated on the PHY 301.

Embodiment 4

Figure 4:
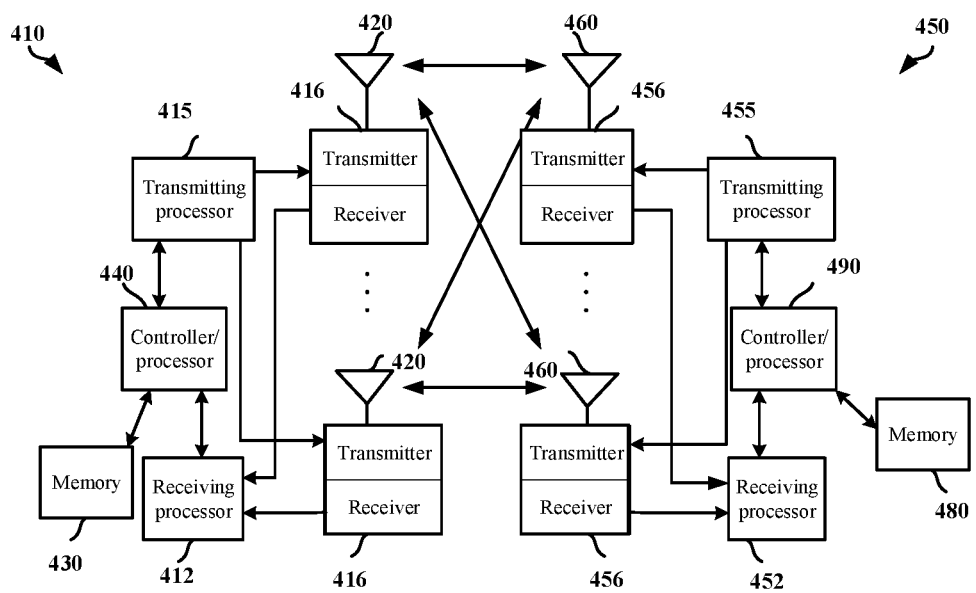
FIG. 4 is a diagram illustrating a first communication node and a second communication node according to one embodiment of the disclosure.

Embodiment 4 illustrates a diagram of a first communication node and a second communication node according to the disclosure, as shown in FIG. 4.

The first communication node 450 includes a controller/processor 490, a memory 480, a receiving processor 452, a transmitter/receiver 456, a transmitting processor 455 and a data source 467, the transmitter/receiver 456 including an antenna 460. The data source 467 provides a higher-layer packet to the controller/processor 490. The controller/processor 490 provides header compression/decompression, encryption/deencryption, packet segmentation and reordering, multiplexing and de-multiplexing between a logical channel and a transport channel, to implement L2 protocols between the user plane and the control plane. The higher-layer packet may include data or control information, for example, DL-SCH or UL-SCH or SL-SCH. The transmitting processor 455 performs various signal transmitting processing functions used for L1 layer (that is, PHY), including encoding, interleaving, scrambling, modulation, power control/allocation, precoding, and generation of physical layer control signalings. The receiving processor 452 performs various signal receiving processing functions used for L1 layer (that is, PHY), including decoding, de-interleaving, descrambling, demodulation, de-precoding, and extraction of physical layer control signalings, etc. The transmitter 456 is configured to convert the baseband signal provided by the transmitting processor 455 into a radio-frequency signal and transmit the radio-frequency signal via the antenna 460. The receiver 456 converts a radio-frequency signal received via the corresponding antenna 460 into a baseband signal and provides the baseband signal to the receiving processor 452. Constitutions in the second communication node 410 are the same as those in the first communication node 450.

In Sidelink (SL) transmission, a higher-layer packet (for example, information carried in the first information, the second information and the first radio signal in the disclosure) is provided to the controller/processor 490. The controller/processor 490 provides a function of a layer 2. The controller/processor 490 provides header compression, encryption, packet segmentation and reordering, multiplexing between a logical channel and a transport channel, and a radio resource allocation based on various priorities. The controller/processor 490 is also in charge of HARQ operation (if supported), retransmission of lost packets, and a signaling to the second communication node 410, for example, the first information and the second signaling in the disclosure are all generated in the controller/processor 490. The transmitting processor 415 performs various signal processing functions used for a layer 1 (that is, physical layer). The signal processing functions include encoding, interleaving, scrambling, power control/allocation, precoding, generation of control signalings, etc. Physical layer signals of the first information, the second information and the first radio signal in the disclosure are all generated on the transmitting processor 455. The modulated signals are divided into parallel streams. Each of the parallel streams is mapped into a corresponding multi-carrier subcarrier and/or multi-carrier symbol and then is mapped to an antenna 460 via the transmitter 456 by the transmitting processor 455 to transmit in the form of RF signal. At the receiving side, every receiver 416 receives an RF signal via the corresponding antenna 420. Every receiver 416 recovers baseband information modulated to the RF carrier and provides the baseband information to a receiving processor 412. The receiving processor 412 performs signal receiving processing functions of the layer 1. The signal receiving processing functions include receptions of physical signals of the first information, the second information and the first radio signal in the disclosure, multicarrier symbols in the multicarrier symbol streams are demodulated corresponding to different modulation schemes (for example, BPSK and QPSK), and then are descrambled, decoded and deinterleaved to recover the data or control signals on a physical channel transmitted by the first communication node 450, then the data and control signals are provided to the controller/processor 440. The controller/processor 440 implements functions of L2 layer, and the controller/processor 440 interprets the information carried in the first information, the second information and the first radio signal in the disclosure. The controller/processor may be connected to a memory 430 that stores program codes and data. The memory 430 may be a computer readable medium.

In one embodiment, the first communication node 450 includes at least one processor and at least one memory. The at least one memory includes computer program codes. The at least one memory and the computer program codes are configured to be used in collaboration with the at least one processor. The first communication node 450 at least transmits first information, the first information being used for indicating a target time length, the target time length being one candidate time length in a target candidate time length set, the target candidate time length set including a positive integer number, greater than 1, of candidate time lengths, and the first information being transmitted through an air interface, and transmits a first radio signal, the first radio signal occupying a first time interval in time domain; wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, the first communication node 450 includes a memory that stores a computer readable instruction program. The computer readable instruction program generates an action when executed by at least one processor. The action includes: transmitting first information, the first information being used for indicating a target time length, the target time length being one candidate time length in a target candidate time length set, the target candidate time length set including a positive integer number, greater than 1, of candidate time lengths, and the first information being transmitted through an air interface, and transmitting a first radio signal, the first radio signal occupying a first time interval in time domain; wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, the second communication node 410 includes at least one processor and at least one memory. The at least one memory includes computer program codes. The at least one memory and the computer program codes are configured to be used in collaboration with the at least one processor. The second communication equipment 410 at least receives first information, the first information being used for indicating a target time length, the target time length being one candidate time length in a target candidate time length set, the target candidate time length set including a positive integer number, greater than 1, of candidate time lengths, and the first information being transmitted through an air interface, and receives a first radio signal, the first radio signal occupying a first time interval in time domain; wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, the second communication node 410 includes a memory that stores a computer readable instruction program. The computer readable instruction program generates an action when executed by at least one processor. The action includes: receiving first information, the first information being used for indicating a target time length, the target time length being one candidate time length in a target candidate time length set, the target candidate time length set including a positive integer number, greater than 1, of candidate time lengths, and the first information being transmitted through an air interface, and receiving a first radio signal, the first radio signal occupying a first time interval in time domain; wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, the transmitter 456 (including antenna 460), the transmitting processor 455 and the controller/processor 490 are used for transmitting the first information in the disclosure.

In one embodiment, the transmitter 456 (including antenna 460), the transmitting processor 455 and the controller/processor 490 are used for transmitting the first radio signal in the disclosure.

In one embodiment, the transmitter 456 (including antenna 460), the transmitting processor 455 and the controller/processor 490 are used for transmitting the second information in the disclosure.

In one embodiment, the receiver 416 (including antenna 420), the receiving processor 412 and the controller/processor 440 are used for receiving the first information in the disclosure.

In one embodiment, the receiver 416 (including antenna 420), the receiving processor 412 and the controller/processor 440 are used for receiving the first radio signal in the disclosure.

In one embodiment, the receiver 416 (including antenna 420), the receiving processor 412 and the controller/processor 440 are used for receiving the second information in the disclosure.

Embodiment 5

Figure 5:
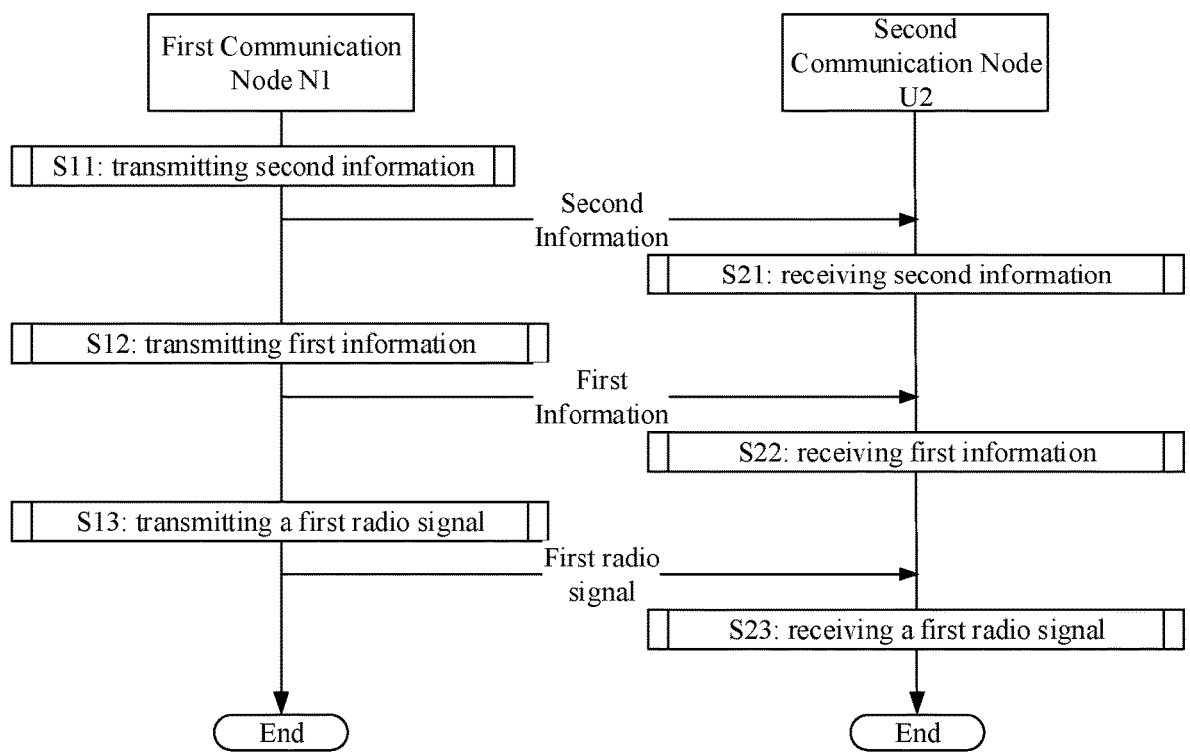
FIG. 5 is a flowchart of transmission of a first radio signal according to one embodiment of the disclosure.

Embodiment 5 illustrates a flowchart of transmission of a radio signal according to one embodiment of the disclosure, as shown in FIG. 5. In FIG. 5, a first communication node N1 performs communication with a second communication node U2. Steps in a dash line box are optional.

The first communication node N1 transmits second information in S11, transmits first information in S12, and transmits a first radio signal in S13.

The second communication node U2 receives second information in S21, receives first information in S22, and receives a first radio signal in S23.

In Embodiment 5, the first information is used for indicating a target time length, the target time length is one candidate time length in a target candidate time length set, the target candidate time length set includes a positive integer number, greater than 1, of candidate time lengths, and the first information is transmitted through an air interface; the first radio signal occupies a first time interval in time domain; herein, the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; at least a former one of a subcarrier spacing of a subcarrier occupied by the first radio signal or a position of frequency domain resources occupied by the first radio signal in frequency domain is used for determining the target candidate time length set; the second information is used for indicating at least one of a subcarrier spacing of a subcarrier occupied by the first radio signal or the first time window, and the second information is transmitted through the air interface.

In one embodiment, the phrase that the second information is used for indicating at least one of a subcarrier spacing of a subcarrier occupied by the first radio signal or the first time window includes: the second information is used for indicating a subcarrier spacing of a subcarrier occupied by the first radio signal, and the second information is also used for indicating the first time window.

In one embodiment, the phrase that the second information is used for indicating at least one of a subcarrier spacing of a subcarrier occupied by the first radio signal or the first time window includes: the second information is used for indicating a subcarrier spacing of a subcarrier occupied by the first radio signal.

In one embodiment, the phrase that the second information is used for indicating at least one of a subcarrier spacing of a subcarrier occupied by the first radio signal or the first time window includes: the second information is also used for indicating the first time window.

In one embodiment, the second information is transmitted through an air interface.

In one embodiment, the second information is transmitted through a Uu interface.

In one embodiment, the second information is transmitted through a radio signal.

In one embodiment, the second information is transmitted from the first communication node to the second communication node in the disclosure.

In one embodiment, the second information is one piece of higher layer information.

In one embodiment, the second information is one piece of physical layer information.

In one embodiment, the second information is transmitted through one physical layer signaling.

In one embodiment, the second information is transmitted through one higher layer signaling.

In one embodiment, the second information includes partial or all of one piece of higher layer information.

In one embodiment, the second information includes partial or all of one piece of physical layer information.

In one embodiment, the second information includes partial or all of one RRC signaling.

In one embodiment, the second information is transmitted through a Sidelink Shared Channel (SL-SCH).

In one embodiment, the second information is transmitted through a Physical Sidelink Shared Channel (PSSCH).

In one embodiment, the second information is transmitted through a Physical Sidelink Control Channel (PSCCH).

In one embodiment, the second information includes one or more fields in one SCI.

In one embodiment, the second information is broadcast.

In one embodiment, the second information is unicast.

In one embodiment, the second information is group specific.

In one embodiment, the second information is UE specific.

In one embodiment, the second information and the first information in the disclosure are transmitted through one same signaling.

In one embodiment, the second information and the first information in the disclosure are transmitted through two different signalings.

In one embodiment, the second information and the first information in the disclosure are transmitted through one same physical channel.

In one embodiment, the second information and the first information in the disclosure are transmitted through two different physical channels.

In one embodiment, the second information and the first information in the disclosure are two different pieces of RRC information.

In one embodiment, the second information and the first information in the disclosure are two different IEs in one same piece of RRC information.

In one embodiment, the second information and the first information in the disclosure are two different fields in one same IE in one same piece of RRC information.

In one embodiment, the second information and the first information in the disclosure are two IEs in two different pieces of RRC information.

In one embodiment, the second information and the first information in the disclosure are two different fields in one same SCI.

In one embodiment, the second information and the first information in the disclosure are two fields in two different SCIs.

In one embodiment, the phrase that the second information is used for indicating at least one of a subcarrier spacing of a subcarrier occupied by the first radio signal or the first time window refers that: the second information is used for directly indicating at least one of a subcarrier spacing of a subcarrier occupied by the first radio signal or the first time window.

In one embodiment, the phrase that the second information is used for indicating at least one of a subcarrier spacing of a subcarrier occupied by the first radio signal or the first time window refers that: the second information is used for indirectly indicating at least one of a subcarrier spacing of a subcarrier occupied by the first radio signal or the first time window.

In one embodiment, the phrase that the second information is used for indicating at least one of a subcarrier spacing of a subcarrier occupied by the first radio signal or the first time window refers that: the second information is used for explicitly indicating at least one of a subcarrier spacing of a subcarrier occupied by the first radio signal or the first time window.

In one embodiment, the phrase that the second information is used for indicating at least one of a subcarrier spacing of a subcarrier occupied by the first radio signal or the first time window refers that: the second information is used for implicitly indicating at least one of a subcarrier spacing of a subcarrier occupied by the first radio signal or the first time window.

Embodiment 6

Figure 6:
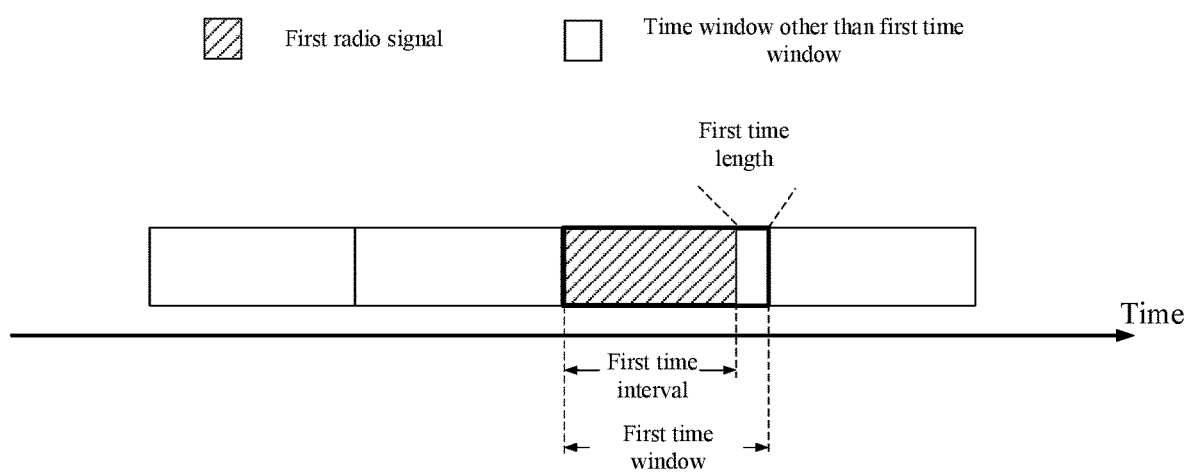
FIG. 6 is a diagram illustrating a target time length according to one embodiment of the disclosure.

Embodiment 6 illustrates a diagram of a target time length according to one embodiment of the disclosure, as shown in FIG. 6. In FIG. 6, the horizontal axis represents time, a small rectangle filled with slashes represents the first radio signal in the disclosure, a bold-line rectangle represents a first time window, and each blank fine-line rectangle represents time windows other than the first time window.

In Embodiment 6, the target time length in the disclosure is one candidate time length in a target candidate time length set, the target candidate time length set includes a positive integer number, greater than 1, of candidate time lengths, the first time interval in the disclosure belongs to a first time window, a time length of the first time window is greater than a time length of the first time interval, time domain resources in the first time window other than the first time interval are reserved as a gap by a transmitter of the first radio signal in the disclosure, and the target time length is equal to a difference value between the time length of the first time window and the time length of the first time interval.

In one embodiment, the target time length is equal to a duration of W1 time unit(s), each one of the W1 time unit(s) has a duration equal to $$\frac{1}{480 \times 10^3 \times 4096}$$

seconds, and the W1 is a positive integer.

In one embodiment, the target time length is equal to Y2 microsecond(s), and the Y2 is a positive rational number.

In one embodiment, the target time length is related to a time needed by a transmitter of the first radio signal to perform Tx-Rx switching in a Frequency Range (FR) for frequency domain resources of the first radio signal.

In one embodiment, the target time length is related to a time needed by a transmitter of the first radio signal to perform Rx-Tx switching in a Frequency Range (FR) for frequency domain resources of the first radio signal.

In one embodiment, the target time length is related to a distance between a transmitter of the first radio signal and a receiver of the first radio signal.

In one embodiment, the first time window is one subframe.

In one embodiment, the first time window is one radio frame.

In one embodiment, for a given subcarrier spacing of a subcarrier occupied by the first radio signal in the disclosure, the first time window is one slot.

In one embodiment, for a given subcarrier spacing of a subcarrier occupied by the first radio signal in the disclosure and a given CP length in a multicarrier symbol occupied by the first radio signal, the first time window is one mini-slot.

In one embodiment, the time length of the first time window is fixed.

In one embodiment, for a given subcarrier spacing of a subcarrier occupied by the first radio signal in the disclosure, the time length of the first time window is fixed.

In one embodiment, for a given subcarrier spacing of a subcarrier occupied by the first radio signal in the disclosure and a given CP length in a multicarrier symbol occupied by the first radio signal, the time length of the first time window is fixed.

In one embodiment, the first time interval is a time interval available for transmission in the first time window.

In one embodiment, the phrase that one time domain resource is reserved as a gap by a transmitter of the first radio signal includes: the time domain resource can neither be used by the transmitter of the first radio signal to perform transmitting nor perform receiving.

In one embodiment, the phrase that one time domain resource is reserved as a gap by a transmitter of the first radio signal includes: the time domain resource cannot be used by the transmitter of the first radio signal to perform transmission.

In one embodiment, the phrase that one time domain resource is reserved as a gap by a transmitter of the first radio signal includes: the time domain resource is used by the transmitter of the first radio signal to perform Tx-Rx switching.

In one embodiment, the phrase that one time domain resource is reserved as a gap by a transmitter of the first radio signal includes: the time domain resource is used by the transmitter of the first radio signal to perform Rx-Tx switching.

In one embodiment, the phrase that onetime domain resource is reserved as a gap by a transmitter of the first radio signal includes: the time domain resource is used by the transmitter of the first radio signal to avoid collision.

In one embodiment, the phrase that one time domain resource is reserved as a gap by a transmitter of the first radio signal includes: the time domain resource is used by the transmitter of the first radio signal to avoid interference and perform Tx-Rx or Rx-Tx switching.

Embodiment 7

Embodiment 7 illustrates a diagram of a relationship between a length of a cyclic prefix and a target candidate time length set according to one embodiment of the disclosure, as shown in FIG. 7. In FIG. 7, the rightmost column represents a target candidate time length set, where $$T_s = \frac{1}{15 \times 10^3 \times 2048}$$

seconds, the second column to left represents an index value of a multicarrier symbol occupied by the gap in a subframe to which multicarrier symbol belongs, suppose a subcarrier spacing of a subcarrier occupied by the first radio signal is equal to 60 kHz, and suppose a position of frequency domain resources occupied by the first radio signal in frequency domain is FR1.

In Embodiment 7, for a given subcarrier spacing of a subcarrier occupied by the first radio signal in the disclosure and a given position of frequency domain resources occupied by the first radio signal in the disclosure in frequency domain, a length of a cyclic prefix in one multicarrier symbol occupied by the first radio signal in time domain is also used for determining the target candidate time length set.

In one embodiment, for a given subcarrier spacing of a subcarrier occupied by the first radio signal, a length of a cyclic prefix in one multicarrier symbol occupied by the first radio signal in time domain is equal to a duration of a normal CP or a duration of an extended CP.

In one embodiment, for a given subcarrier spacing $\Delta f$ kHz of a subcarrier occupied by the first radio signal, a length of a cyclic prefix in one multicarrier symbol occupied by the first radio signal in time domain is equal to one of $512\kappa \cdot 2^{-\mu} \cdot T_c$, $(144\kappa \cdot 2^{-\mu}+16\kappa) \cdot T_c$ and $144\kappa \cdot 2^{-\mu} \cdot T_c$, where $$T_c = \frac{1}{480 \times 10^3 \times 4096}$$

seconds, $\kappa=64$, $\mu=\log_2(\Delta f/15)$.

In one embodiment, the phrase that a length of a cyclic prefix in one multicarrier symbol occupied by the first radio signal in time domain is also used for determining the target candidate time length set refers that: the length of a cyclic prefix in one multicarrier symbol occupied by the first radio signal in time domain is also used by the first communication node in the disclosure to determine the target candidate time length set.

In one embodiment, the phrase that a length of a cyclic prefix in one multicarrier symbol occupied by the first radio signal in time domain is also used for determining the target candidate time length set refers that: the length of a cyclic prefix in one multicarrier symbol occupied by the first radio signal in time domain is also used by the second communication node in the disclosure to determine the target candidate time length set.

In one embodiment, the phrase that a length of a cyclic prefix in one multicarrier symbol occupied by the first radio signal in time domain is also used for determining the target candidate time length set refers that: the length of a cyclic prefix in one multicarrier symbol occupied by the first radio signal in time domain is used for determining the target candidate time length set based on a mapping relationship.

In one embodiment, the phrase that a length of a cyclic prefix in one multicarrier symbol occupied by the first radio signal in time domain is also used for determining the target candidate time length set refers that: the length of a cyclic prefix in one multicarrier symbol occupied by the first radio signal in time domain is used for determining the target candidate time length set based on a function relationship.

In one embodiment, the phrase that a length of a cyclic prefix in one multicarrier symbol occupied by the first radio signal in time domain is also used for determining the target candidate time length set refers that: the length of a cyclic prefix in one multicarrier symbol occupied by the first radio signal in time domain is used for determining the target candidate time length set based on a mapping table.

In one embodiment, the phrase that a length of a cyclic prefix in one multicarrier symbol occupied by the first radio signal in time domain is also used for determining the target candidate time length set refers that: the length of a cyclic prefix in one multicarrier symbol occupied by the first radio signal in time domain is one of W candidate lengths, the W candidate lengths are one-to-one corresponding to W candidate time length set groups, each one of the W candidate time length set group includes a positive integer number of candidate time length sets, and the target candidate time length set belongs to a candidate time length set group among the W candidate time length set groups that is corresponding to the length of a cyclic prefix in one multicarrier symbol occupied by the first radio signal in time domain.

Embodiment 8

Embodiment 8 illustrates a diagram of a first threshold and a second threshold according to one embodiment of the disclosure, as shown in FIG. 8. In FIG. 8, the two rightmost columns represent a first threshold and a second threshold respectively, herein, $$T_s = \frac{1}{15 \times 10^3 \times 2048}$$

seconds, the leftmost column represents a position (FR1 or FR2) of frequency domain resources occupied by the first radio signal in frequency domain, and suppose a subcarrier spacing of a subcarrier occupied by the first radio signal is 60 kHz.

In one embodiment, the position of frequency domain resources occupied by the first radio signal in the disclosure in frequency domain is used for determining at least one of a first threshold or a second threshold, the first threshold is equal to a maximum candidate time length in the target candidate time length set in the disclosure, and the second threshold is equal to a minimum candidate time length in the target candidate time length set in the disclosure.

In one embodiment, the first threshold is in unit of millisecond.

In one embodiment, the second threshold is in unit of millisecond.

In one embodiment, the first threshold is in unit of microsecond.

In one embodiment, the second threshold is in unit of microsecond.

In one embodiment, the first threshold and the second threshold are not equal.

In one embodiment, the first threshold is greater than the second threshold.

In one embodiment, the phrase that the position of frequency domain resources occupied by the first radio signal in frequency domain is used for determining at least one of the first threshold or the second threshold includes: the position of frequency domain resources occupied by the first radio signal in frequency domain is used for determining the first threshold and the second threshold.

In one embodiment, the phrase that the position of frequency domain resources occupied by the first radio signal in frequency domain is used for determining at least one of the first threshold or the second threshold includes: the position of frequency domain resources occupied by the first radio signal in frequency domain is used for determining the second threshold.

In one embodiment, the phrase that the position of frequency domain resources occupied by the first radio signal in frequency domain is used for determining at least one of the first threshold or the second threshold includes: the position of frequency domain resources occupied by the first radio signal in frequency domain is used for determining the first threshold.

In one embodiment, the phrase that the position of frequency domain resources occupied by the first radio signal in frequency domain is used for determining at least one of the first threshold or the second threshold refers that: the position of frequency domain resources occupied by the first radio signal in frequency domain is used by the first communication node in the disclosure to determine at least one of the first threshold or the second threshold.

In one embodiment, the phrase that the position of frequency domain resources occupied by the first radio signal in frequency domain is used for determining at least one of the first threshold or the second threshold refers that: the position of frequency domain resources occupied by the first radio signal in frequency domain is used by the second communication node in the disclosure to determine at least one of the first threshold or the second threshold.

In one embodiment, the phrase that the position of frequency domain resources occupied by the first radio signal in frequency domain is used for determining at least one of the first threshold or the second threshold refers that: the position of frequency domain resources occupied by the first radio signal in frequency domain is used for determining at least one of the first threshold or the second threshold based on a mapping relationship.

In one embodiment, the phrase that the position of frequency domain resources occupied by the first radio signal in frequency domain is used for determining at least one of the first threshold or the second threshold refers that: the position of frequency domain resources occupied by the first radio signal in frequency domain is used for determining at least one of the first threshold or the second threshold based on a function relationship.

In one embodiment, the phrase that the position of frequency domain resources occupied by the first radio signal in frequency domain is used for determining at least one of the first threshold or the second threshold refers that: the position of frequency domain resources occupied by the first radio signal in frequency domain is used for determining at least one of the first threshold or the second threshold based on a table mapping.

Embodiment 9

Embodiment 9 illustrates a diagram of a relationship between a first time length, a second time length and a target candidate time length set according to one embodiment of the disclosure, as shown in FIG. 9. In FIG. 9, the first column to left represents a subcarrier spacing of a subcarrier occupied by a first radio signal, the second column to left represents a first time length, the third column to left represents a second time length, the fourth column to left represents a CP length, the second column to right represents a target candidate time length set when frequency domain resources occupied by the first radio signal belong to FR1 in frequency domain, and the rightmost column represents a target candidate time length set when frequency domain resources occupied by the first radio signal belong to FR2 in frequency domain, wherein $$T_s = \frac{1}{15 \times 10^3 \times 2048}$$

seconds.

In Embodiment 9, a duration in time domain of one multicarrier symbol among the multicarrier symbols occupied by the first radio signal in the disclosure is equal to a first time length; a data time length in one multicarrier symbol among the multicarrier symbols occupied by the first radio signal in the disclosure is equal to a second time length; any one candidate time length in the target candidate time length set in the disclosure is equal to a summation of K1 time(s) of the first time length plus K2 time(s) of the second time length, K1 is a non-negative integer, and K2 is equal to a difference between 1 and a non-negative integral power of ½; and a subcarrier spacing of a subcarrier occupied by the first radio signal in the disclosure is used for determining the first time length and the second time length.

In one embodiment, any one candidate time length in the target candidate time length set is equal to $K1 \cdot N_{OS}^{\mu} + K2 \cdot N_u^{\mu}$, where $N_{OS}^{\mu}$ represents the first time length, $N_u^{\mu}$ represents the second time length, K1 represents a non-negative integer, $$K2 = \left(1 - \left(\frac{1}{2}\right)^{\alpha}\right),$$

and α represents a non-negative integer.

In one embodiment, there exists a non-negative integer K1 and a non-negative integer α and $$K2 = \left(1 - \left(\frac{1}{2}\right)^{\alpha}\right),$$

such that $K1 \cdot N_{OS}^{\mu} + K2 \cdot N_u^{\mu}$ is equal to one candidate time length in the target candidate time length set, where $N_{OS}^{\mu}$ represents the first time length, and $N_u^{\mu}$ represents the second time length.

In one embodiment, for any one candidate time length $\beta_n$ in the target candidate time length set, there exists a non-negative integer K1 and a non-negative integer α

$$K2 = \left(1 - \left(\frac{1}{2}\right)^{\alpha}\right),$$

such that $K1 \cdot N_{OS}^{\mu} + K2 \cdot N_u^{\mu}$ is equal to the candidate time length $\beta_n$, where $N_{OS}^{\mu}$ represents the first time length, and $N_u^{\mu}$ represents the second time length.

In one embodiment, there exists one candidate time length in the target candidate time length set that is equal to $a \cdot N_{OS}^{\mu}$, where $a \cdot N_{OS}^{\mu}$ represents the first time length, and a represents a positive integer.

In one embodiment, there exists no candidate time length in the target candidate time length set that is equal to $a \cdot N_{OS}^{\mu}$, where $a \cdot N_{OS}^{\mu}$ represents the first time length, and a represents a positive integer.

In one embodiment, there exists one candidate time length in the target candidate time length set that is equal to a positive integral multiple of the first time length.

In one embodiment, there exists no candidate time length in the target candidate time length set that is equal to a positive integral multiple of the first time length.

In one embodiment, there exists one candidate time length in the target candidate time length set that is equal to $$\left(1 - \left(\frac{1}{2}\right)^b\right) \cdot N_u^{\mu},$$

where $N_u^\mu$ represents the second time length, and b represents a positive integer.

In one embodiment, there exists no candidate time length in the target candidate time length set that is equal to $$\left(1-\left(\frac{1}{2}\right)^b\right)\cdot N_u^\mu,$$

where $N_u^\mu$ represents the second time length, and b represents a positive integer.

In one embodiment, there exists one candidate time length in the target candidate time length set that is equal to K2 times of the second time length, and K2 is equal to a difference between 1 and a non-negative integral power of ½.

In one embodiment, there exists no candidate time length in the target candidate time length set that is equal to K2 times of the second time length, and K2 is equal to a difference between 1 and a non-negative integral power of ½.

In one embodiment, a data time length in each multicarrier symbol among the multicarrier symbols occupied by the first radio signal is equal to the second time length.

In one embodiment, the second time length is equal to a duration other than a CP in one multicarrier symbol among the multicarrier symbols occupied by the first radio signal.

In one embodiment, the second time length is equal to a duration in time domain of a multicarrier symbol corresponding to the second time length minus a duration of a CP in the multicarrier symbol corresponding to the second time length.

In one embodiment, the second time length is equal to the first time length minus a duration in time domain of a CP in a multicarrier symbol corresponding to the first time length.

In one embodiment, the second time length is equal to $N_{OS}^\mu - N_{CP}^\mu$, wherein $N_{OS}^\mu$ and $N_{CP}^\mu$ represent a duration in time domain of one multicarrier symbol among the multicarrier symbols occupied by the first radio signal and a duration of a CP respectively.

In one embodiment, a multicarrier symbol corresponding to the first time length and a multicarrier symbol corresponding to the second time length are one same multicarrier symbol.

In one embodiment, a multicarrier symbol corresponding to the first time length and a multicarrier symbol corresponding to the second time length are different multicarrier symbols.

In one embodiment, any two multicarrier symbols among the multicarrier symbols occupied by the first radio signal have a same duration in time domain.

In one embodiment, two multicarrier symbols among the multicarrier symbols occupied by the first radio signal have different durations in time domain.

In one embodiment, the phrase that a subcarrier spacing of a subcarrier occupied by the first radio signal is used for determining the first time length and the second time length refers that: a subcarrier spacing of a subcarrier occupied by the first radio signal is used for determining the first time length and the second time length based on a mapping relationship.

In one embodiment, the phrase that a subcarrier spacing of a subcarrier occupied by the first radio signal is used for determining the first time length and the second time length refers that: a subcarrier spacing of a subcarrier occupied by the first radio signal is used for determining the first time length and the second time length based on a function relationship.

In one embodiment, the phrase that a subcarrier spacing of a subcarrier occupied by the first radio signal is used for determining the first time length and the second time length refers that: the first time length and the second time length are both in inversely proportional to a subcarrier spacing of a subcarrier occupied by the first radio signal.

In one embodiment, the phrase that a subcarrier spacing of a subcarrier occupied by the first radio signal is used for determining the first time length and the second time length refers that: the first time length is equal to $$\frac{15}{\Delta f}\cdot N_{OS}^{15},$$

the second time length is equal to $$\frac{15}{\Delta f}\cdot(N_{OS}^{15}-N_{CP}^{15}),$$

where $N_{OS}^{15}$ represents a duration of one multicarrier symbol in the case of 15 KHz subcarrier spacing, $N_{OS}^{15}$ represents a duration of a CP in the case of 15 KHz, and $\Delta f$ represents a subcarrier spacing of a subcarrier occupied by the first radio signal.

In one embodiment, the phrase that a subcarrier spacing of a subcarrier occupied by the first radio signal is used for determining the first time length and the second time length refers that: a subcarrier spacing of a subcarrier occupied by the first radio signal is used for determining the first time length and the second time length according to the computation in Chapter 5.3.1 in 3GPP TS38.211 (v15.2.0), wherein $(N_u^\mu+N_{CP,1}^\mu)T_c$ represents the first time length, and $N_u^\mu\cdot T_c$ represents the second time length.

In one embodiment, the target candidate time length set includes all time length values between the first threshold in the disclosure and the second threshold in the disclosure which are equal to a summation of K1 times of the first time length plus K2 times of the second time length.

In one embodiment, the target candidate time length set includes partial time length values between the first threshold in the disclosure and the second threshold in the disclosure which are equal to a summation of K1 times of the first time length plus K2 times of the second time length.

Embodiment 10

Embodiment 10 illustrates a diagram of a maximum sampling interval length according to one embodiment of the disclosure, as shown in FIG. 10. In FIG. 10, supposing a first radio signal occupies one Physical Resource Block (PRB) in frequency domain, the first column to left represents a subcarrier spacing of a subcarrier occupied by the first radio signal, and the second column to left represents a maximum sampling interval length.

In Embodiment 10, each candidate time length in the target candidate time length set in the disclosure is equal to a positive integral multiple of a maximum sampling interval length, and a subcarrier spacing of a subcarrier occupied by the first radio signal in the disclosure is used for determining the maximum sampling interval length.

In one embodiment, the phrase that a subcarrier spacing of a subcarrier occupied by the first radio signal is used for determining the maximum sampling interval length refers that: for a given bandwidth of frequency domain resources occupied by the first radio signal, the maximum sampling interval length is inversely proportional to a subcarrier spacing of a subcarrier occupied by the first radio signal.

In one embodiment, the phrase that a subcarrier spacing of a subcarrier occupied by the first radio signal is used for determining the maximum sampling interval length refers that: the maximum sampling interval length $T_s^{max}$ is equal to $$\frac{1}{2^\delta \cdot \Delta f},$$

where $\Delta f$ represents a subcarrier spacing of a subcarrier occupied by the first radio signal, and $\delta$ represents a smallest positive integer such that $2^\delta \cdot \Delta f$ is not less than the bandwidth of frequency domain resources occupied by the first radio signal.

In one embodiment, the maximum sampling interval length is a reciprocal value of a minimum sampling rate that a receiver of the first radio signal may employ when sampling a baseband signal of the first radio signal.

In one embodiment, a sampling interval length that a receiver of the first radio signal may employ when sampling a baseband signal of the first radio signal is autonomously determined by the receiver of the first radio signal, on the condition that the sampling interval length is not greater than the maximum sampling interval length.

In one embodiment, a sampling interval length that a receiver of the first radio signal may employ when sampling a baseband signal of the first radio signal is an implementation issue.

Embodiment 11

Figure 11:
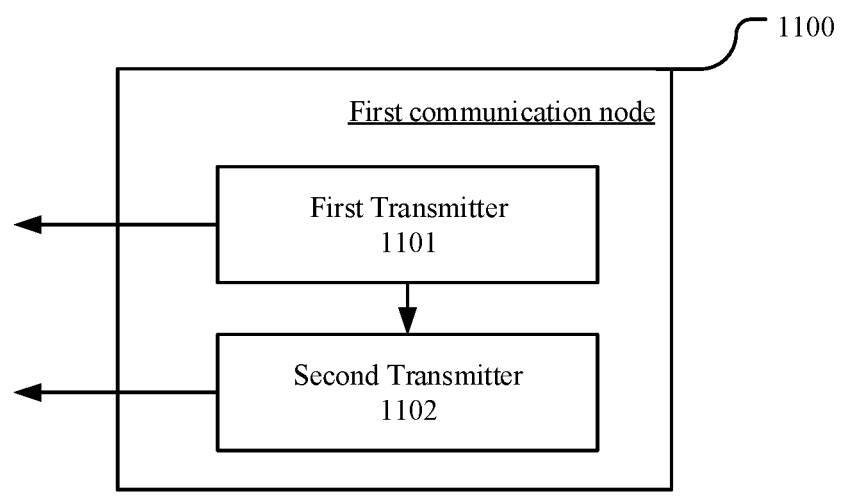
FIG. 11 is a structure block diagram illustrating a processing device in a first communication node according to one embodiment of the disclosure.

Embodiment 11 illustrate a structure block diagram of a processing device in a first communication node according to one embodiment, as shown in FIG. 11. In FIG. 11, the processing device 1100 in the first communication node mainly includes a first transmitter 1101 and a second transmitter 1102. The first transmitter 1101 includes the transmitter 456 (including antenna 460), the transmitting processor 455 and the controller/processor 490 in FIG. 4; and the second transmitter 1102 includes the transmitter 456 (including antenna 460), the transmitting processor 455 and the controller/processor 490 in FIG. 4.

In Embodiment 11, the first transmitter 1101 transmits first information, the first information is used for indicating a target time length, the target time length is one candidate time length in a target candidate time length set, the target candidate time length set includes a positive integer number, greater than 1, of candidate time lengths, and the first information is transmitted through an air interface; and the second transmitter 1102 transmits a first radio signal, and the first radio signal occupies a first time interval in time domain; wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, for a given subcarrier spacing of a subcarrier occupied by the first radio signal and a given position of frequency domain resources occupied by the first radio signal in frequency domain, a length of a cyclic prefix in one multicarrier symbol occupied by the first radio signal in time domain is also used for determining the target candidate time length set.

In one embodiment, the position of frequency domain resources occupied by the first radio signal in frequency domain is used for determining at least one of a first threshold or a second threshold, the first threshold is equal to a maximum candidate time length in the target candidate time length set, and the second threshold is equal to a minimum candidate time length in the target candidate time length set.

In one embodiment, a duration in time domain of one multicarrier symbol among the multicarrier symbols occupied by the first radio signal is equal to a first time length; a data time length in one multicarrier symbol among the multicarrier symbols occupied by the first radio signal is equal to a second time length; any one candidate time length in the target candidate time length set is equal to a summation of K1 time(s) of the first time length plus K2 time(s) of the second time length, K1 is a non-negative integer, and K2 is equal to a difference between 1 and a non-negative integral power of ½; and a subcarrier spacing of a subcarrier occupied by the first radio signal is used for determining the first time length and the second time length.

In one embodiment, each candidate time length in the target candidate time length set is equal to a positive integral multiple of a maximum sampling interval length, and a subcarrier spacing of a subcarrier occupied by the first radio signal is used for determining the maximum sampling interval length.

In one embodiment, the first transmitter 1101 also transmits second information, wherein the second information is used for indicating at least one of a subcarrier spacing of a subcarrier occupied by the first radio signal or the first time window, and the second information is transmitted through the air interface.

Embodiment 12

Figure 12:
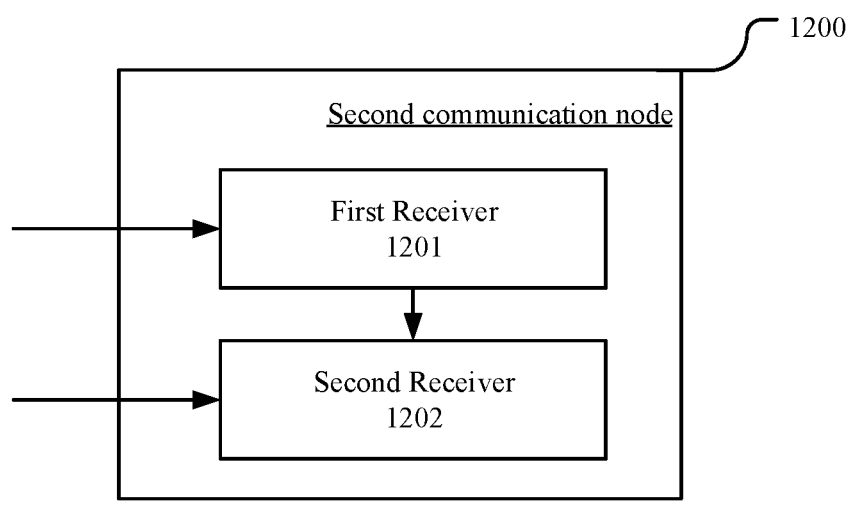
FIG. 12 is a structure block diagram illustrating a processing device in a second communication node according to one embodiment of the disclosure.

Embodiment 12 illustrates a structure block diagram of a processing device in a second communication node according to one embodiment, as shown in FIG. 12. In FIG. 2, the processing device 1200 in the second communication node mainly includes a first receiver 1201 and a second receiver 1202. The first receiver 1201 includes the transmitter/receiver 416 (including antenna 420), the receiving processor 412 and the controller/processor 440 in FIG. 4; and the second receiver 1202 includes the transmitter/receiver 416 (including antenna 420), the receiving processor 412 and the controller/processor 440 in FIG. 4.

In Embodiment 12, the first receiver 1201 receives first information, the first information is used for indicating a target time length, the target time length is one candidate time length in a target candidate time length set, the target candidate time length set includes a positive integer number, greater than 1, of candidate time lengths, and the first information is transmitted through an air interface; the second receiver 1202 receives a first radio signal, and the first radio signal occupies a first time interval in time domain; wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

In one embodiment, for a given subcarrier spacing of a subcarrier occupied by the first radio signal and a given position of frequency domain resources occupied by the first radio signal in frequency domain, a length of a cyclic prefix in one multicarrier symbol occupied by the first radio signal in time domain is also used for determining the target candidate time length set.

In one embodiment, the position of frequency domain resources occupied by the first radio signal in frequency domain is used for determining at least one of a first threshold or a second threshold, the first threshold is equal to a maximum candidate time length in the target candidate time length set, and the second threshold is equal to a minimum candidate time length in the target candidate time length set.

In one embodiment, a duration in time domain of one multicarrier symbol among the multicarrier symbols occupied by the first radio signal is equal to a first time length; the product of a difference between (1 and the K1th power of 2) times a data time length in one multicarrier symbol among the multicarrier symbols occupied by the first radio signal is equal to a second time length; K1 is an integer less than 1; any one candidate time length in the target candidate time length set is equal to a summation of the second time length plus K2 time(s) of the first time length, and K2 is a non-negative integer; and a subcarrier spacing of a subcarrier occupied by the first radio signal is used for determining the first time length and the second time length.

In one embodiment, each candidate time length in the target candidate time length set is equal to a positive integral multiple of a maximum sampling interval length, and a subcarrier spacing of a subcarrier occupied by the first radio signal is used for determining the maximum sampling interval length.

In one embodiment, the first receiver 1201 further receiver second information; wherein the second information is used for indicating at least one of a subcarrier spacing of a subcarrier occupied by the first radio signal or the first time window, and the second information is transmitted through the air interface.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first communication node, the second communication node or the UE or the terminal in the disclosure includes but not limited to mobile phones, tablet computers, laptops, network cards, low-power equipment, eMTC terminals, NB-IOT terminals, vehicle-mounted communication equipment, RSUs, aircrafts, airplanes, unmanned aerial vehicles, telecontrolled aircrafts, and other radio communication equipment. The first communication node in the disclosure can further include but not limited to base stations or network side equipment, including but not limiting to macro-cellular base stations, micro-cellular base stations, home base stations, relay base stations, eNBs, gNBs, TRPs and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first communication node for wireless communication, comprising:
   transmitting first information, the first information being used for indicating a target time length, the target time length being one candidate time length in a target candidate time length set, the target candidate time length set comprising a positive integer number, greater than 1, of candidate time lengths, and the first information being transmitted through an air interface; and
   transmitting a first radio signal, the first radio signal occupying a first time interval in time domain;
   wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

2. The method according to claim 1, wherein for a given subcarrier spacing of a subcarrier occupied by the first radio signal and a given position of frequency domain resources occupied by the first radio signal in frequency domain, a length of a cyclic prefix in one multicarrier symbol occupied by the first radio signal in time domain is also used for determining the target candidate time length set.

3. The method according to claim 1, wherein the position of frequency domain resources occupied by the first radio signal in frequency domain is used for determining at least one of a first threshold or a second threshold, the first threshold is equal to a maximum candidate time length in the target candidate time length set, and the second threshold is equal to a minimum candidate time length in the target candidate time length set.

4. The method according to claim 1, wherein a duration in time domain of one multicarrier symbol among the multicarrier symbols occupied by the first radio signal is equal to a first time length; a data time length in one multicarrier symbol among the multicarrier symbols occupied by the first radio signal is equal to a second time length; any one candidate time length in the target candidate time length set is equal to a summation of K1 time(s) of the first time length plus K2 time(s) of the second time length, K1 is a non-negative integer, and K2 is equal to a difference between 1 and a non-negative integral power of ½; and a subcarrier spacing of a subcarrier occupied by the first radio signal is used for determining the first time length and the second time length.

5. The method according to claim 1, wherein each candidate time length in the target candidate time length set is equal to a positive integral multiple of a maximum sampling interval length, and a subcarrier spacing of a subcarrier occupied by the first radio signal is used for determining the maximum sampling interval length.

6. The method according to claim 1, further comprising: transmitting second information;
wherein the second information is used for indicating at least one of a subcarrier spacing of a subcarrier occupied by the first radio signal or the first time window, and the second information is transmitted through the air interface.

7. The method according to claim 1, wherein each candidate time length in the target candidate time length set is equal to $a \cdot N_{OS}^{\mu} + d \cdot N_u^{\mu}$, where $N_{OS}^{\mu}$ represents a duration in time domain of one multicarrier symbol among the multicarrier symbols occupied by the first radio signal, $N_{OS}^{\mu} = N_u^{\mu} + N_{CP,1}^{\mu}$, $N_u^{\mu}$ represents a data time length in one multicarrier symbol among the multicarrier symbols occupied by the first radio signal, $N_{CP,1}^{\mu}$ represents a length of a cyclic prefix in one multicarrier symbol among the multicarrier symbols occupied by the first radio signal, a represents a non-negative positive integer, d is equal to 0 or d is equal to a negative integral power of 2.

8. A first communication node for wireless communication, comprising:
a first transmitter, to transmit first information, the first information being used for indicating a target time length, the target time length being one candidate time length in a target candidate time length set, the target candidate time length set comprising a positive integer number, greater than 1, of candidate time lengths, and the first information being transmitted through an air interface; and
a second transmitter, to transmit a first radio signal, the first radio signal occupying a first time interval in time domain;
wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

9. The first communication node according to claim 8, wherein for a given subcarrier spacing of a subcarrier occupied by the first radio signal and a given position of frequency domain resources occupied by the first radio signal in frequency domain, a length of a cyclic prefix in one multicarrier symbol occupied by the first radio signal in time domain is also used for determining the target candidate time length set.

10. The first communication node according to claim 8, wherein the position of frequency domain resources occupied by the first radio signal in frequency domain is used for determining at least one of a first threshold or a second threshold, the first threshold is equal to a maximum candidate time length in the target candidate time length set, and the second threshold is equal to a minimum candidate time length in the target candidate time length set.

11. The first communication node according to claim 8, wherein a duration in time domain of one multicarrier symbol among the multicarrier symbols occupied by the first radio signal is equal to a first time length; a data time length in one multicarrier symbol among the multicarrier symbols occupied by the first radio signal is equal to a second time length; any one candidate time length in the target candidate time length set is equal to a summation of K1 time(s) of the first time length plus K2 time(s) of the second time length, K1 is a non-negative integer, and K2 is equal to a difference between 1 and a non-negative integral power of ½; and a subcarrier spacing of a subcarrier occupied by the first radio signal is used for determining the first time length and the second time length.

12. The first communication node according to claim 8, wherein each candidate time length in the target candidate time length set is equal to a positive integral multiple of a maximum sampling interval length, and a subcarrier spacing of a subcarrier occupied by the first radio signal is used for determining the maximum sampling interval length.

13. The first communication node according to claim 8, wherein the first transmitter transmits second information, wherein the second information is used for indicating at least one of a subcarrier spacing of a subcarrier occupied by the first radio signal or the first time window, and the second information is transmitted through the air interface.

14. The first communication node according to claim 8, wherein each candidate time length in the target candidate time length set is equal to $a \cdot N_{OS}^{\mu} + d \cdot N_u^{\mu}$, where $N_{OS}^{\mu}$ represents a duration in time domain of one multicarrier symbol among the multicarrier symbols occupied by the first radio signal, $N_{OS}^{\mu} = N_u^{\mu} + N_{CP,1}^{\mu}$, $N_u^{\mu}$ represents a data time length in one multicarrier symbol among the multicarrier symbols occupied by the first radio signal, $N_{CP,1}^{\mu}$ represents a length of a cyclic prefix in one multicarrier symbol among the multicarrier symbols occupied by the first radio signal, a represents a non-negative positive integer, d is equal to 0 or d is equal to a negative integral power of 2.

15. A second communication node for wireless communication, comprising:
a first receiver, to receive first information, the first information being used for indicating a target time length, the target time length being one candidate time length in a target candidate time length set, the target candidate time length set comprising a positive integer number, greater than 1, of candidate time lengths, and the first information being transmitted through an air interface; and
a second receiver, to receive a first radio signal, the first radio signal occupying a first time interval in time domain;
wherein the first time interval belongs to a first time window, a time length of the first time window is greater than a time length of the first time interval, time domain resources in the first time window other than the first time interval are reserved as a gap by a transmitter of the first radio signal, and the target time length is equal to a difference value between the time length of the first time window and the time length of the first time interval; and at least a former one of a subcarrier spacing of a subcarrier occupied by the first radio signal or a position of frequency domain resources occupied by the first radio signal in frequency domain is used for determining the target candidate time length set.

16. The second communication node according to claim 15, wherein for a given subcarrier spacing of a subcarrier occupied by the first radio signal and a given position of frequency domain resources occupied by the first radio signal in frequency domain, a length of a cyclic prefix in one multicarrier symbol occupied by the first radio signal in time domain is also used for determining the target candidate time length set.

17. The second communication node according to claim 15, wherein the position of frequency domain resources occupied by the first radio signal in frequency domain is used for determining at least one of a first threshold or a second threshold, the first threshold is equal to a maximum candidate time length in the target candidate time length set, and the second threshold is equal to a minimum candidate time length in the target candidate time length set.

18. The second communication node according to claim 15, wherein a duration in time domain of one multicarrier symbol among the multicarrier symbols occupied by the first radio signal is equal to a first time length; a data time length in one multicarrier symbol among the multicarrier symbols occupied by the first radio signal is equal to a second time length; any one candidate time length in the target candidate time length set is equal to a summation of K1 time(s) of the first time length plus K2 time(s) of the second time length, K1 is a non-negative integer, and K2 is equal to a difference between 1 and a non-negative integral power of ½; and a subcarrier spacing of a subcarrier occupied by the first radio signal is used for determining the first time length and the second time length.

19. The second communication node according to claim 15, wherein each candidate time length in the target candidate time length set is equal to a positive integral multiple of a maximum sampling interval length, and a subcarrier spacing of a subcarrier occupied by the first radio signal is used for determining the maximum sampling interval length.

20. The second communication node according to claim 15, wherein each candidate time length in the target candidate time length set is equal to $a \cdot N_{OS}^{\mu} + d \cdot N_u^{\mu}$, where $N_{OS}^{\mu}$ represents a duration in time domain of one multicarrier symbol among the multicarrier symbols occupied by the first radio signal, $N_{OS}^{\mu} = N_u^{\mu} + N_{CP,1}^{\mu}$, $N_u^{\mu}$ represents a data time length in one multicarrier symbol among the multicarrier symbols occupied by the first radio signal, $N_{CP,1}^{\mu}$ represents a length of a cyclic prefix in one multicarrier symbol among the multicarrier symbols occupied by the first radio signal, a represents a non-negative positive integer, d is equal to 0 or d is equal to a negative integral power of 2.

* * * * *